Aug. 18, 1931.  G. S. SMITH  1,819,044
NUT MACHINE
Filed March 29, 1926    5 Sheets-Sheet 2

WITNESS:
J. Herbert Bradley

INVENTOR
George S. Smith
By Green and McAllister
His Attorneys

Aug. 18, 1931.    G. S. SMITH    1,819,044
NUT MACHINE
Filed March 29, 1926    5 Sheets-Sheet 3

WITNESS:—
J. Herbert Bradley

INVENTOR
George S. Smith
By Green and McAllister
His Attorneys

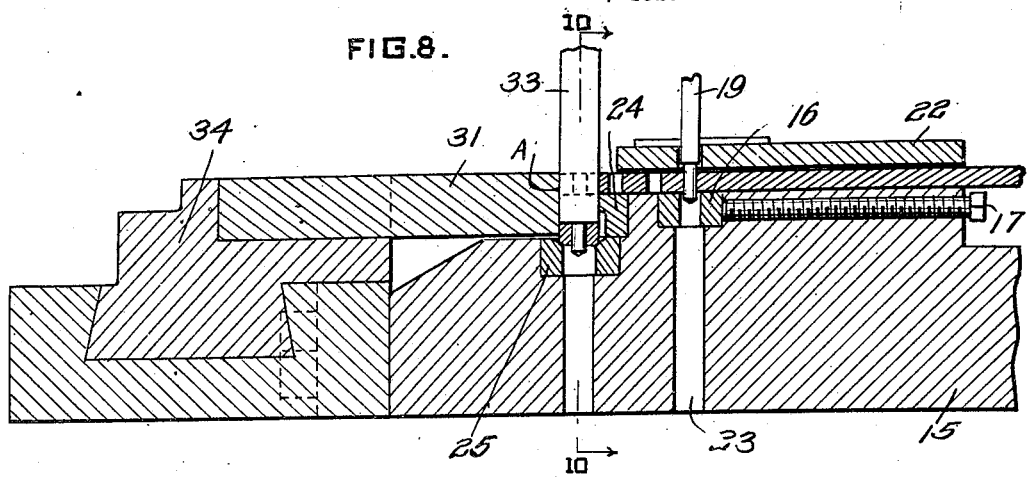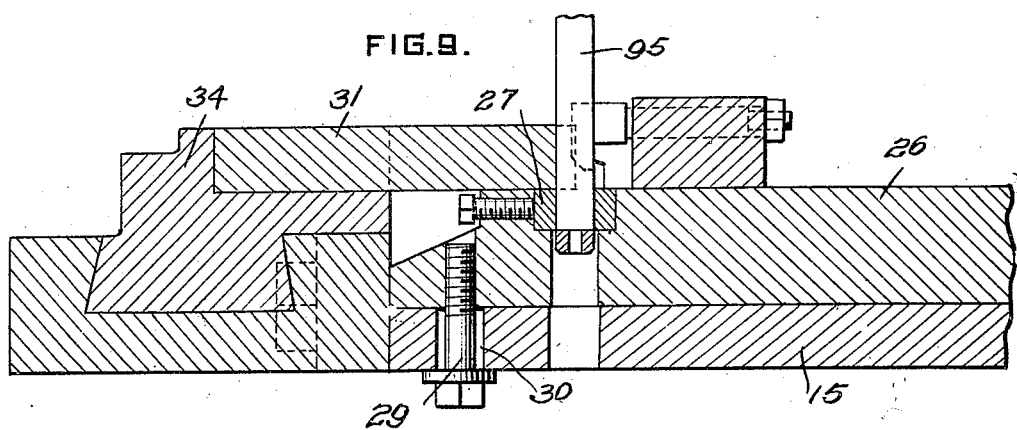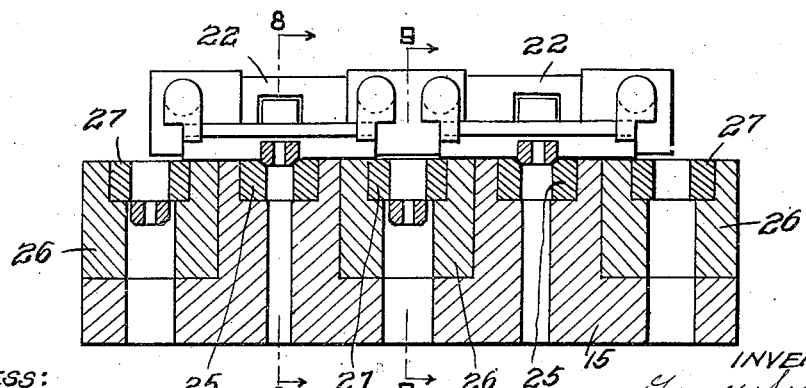

Aug. 18, 1931.    G. S. SMITH    1,819,044
NUT MACHINE
Filed March 29, 1926    5 Sheets-Sheet 5

WITNESS:
J. Herbert Bradley.

INVENTOR
George S. Smith
By Green and McCallister
His Attorneys

Patented Aug. 18, 1931

1,819,044

UNITED STATES PATENT OFFICE

GEORGE S. SMITH, OF PITTSBURGH, PENNSYLVANIA, ASSIGNOR, BY MESNE ASSIGNMENTS, TO PITTSBURGH SCREW AND BOLT CORPORATION, A CORPORATION OF PENNSYLVANIA

NUT MACHINE

Application filed March 29, 1926. Serial No. 98,180.

This invention relates to metal working machines and more particularly to nut making machines for manufacturing nuts from bars of stock.

An object of this invention is to provide a machine of the character described which is of simple construction and which is more effective in operation than similar machines in use and known to me.

A further object is to provide a machine of simple construction which, with a smaller number of parts, is capable of attaining results not heretofore accomplished by similar machines now in use and known to me.

A still further object is to produce a nut making machine which is capable of simultaneously operating on more than one bar of stock and in which the multiplication of certain mechanisms is avoided by employing the same in carrying forward the operations on the blanks formed from different bars of stock.

Figure 1:
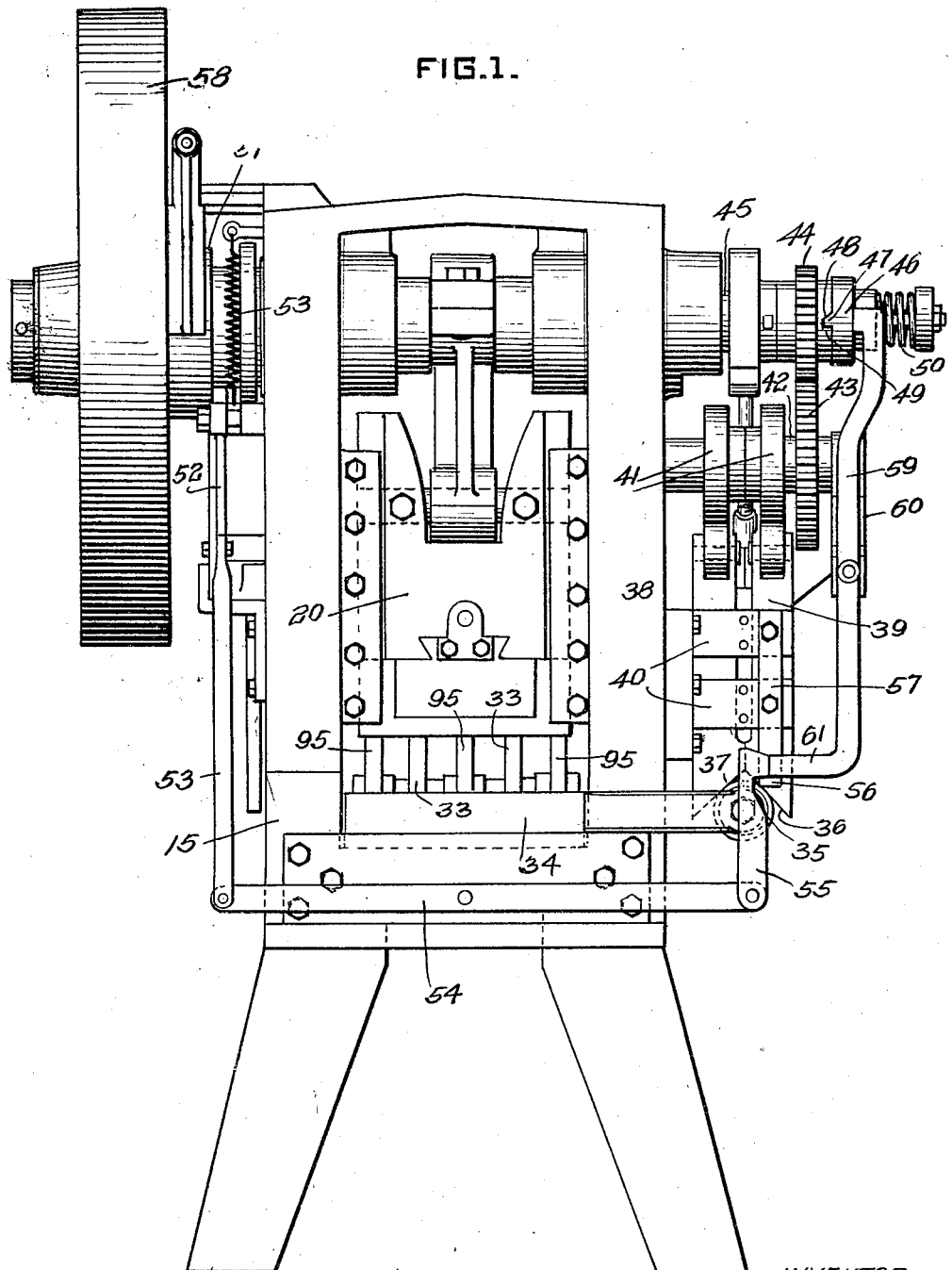
Figure 2:
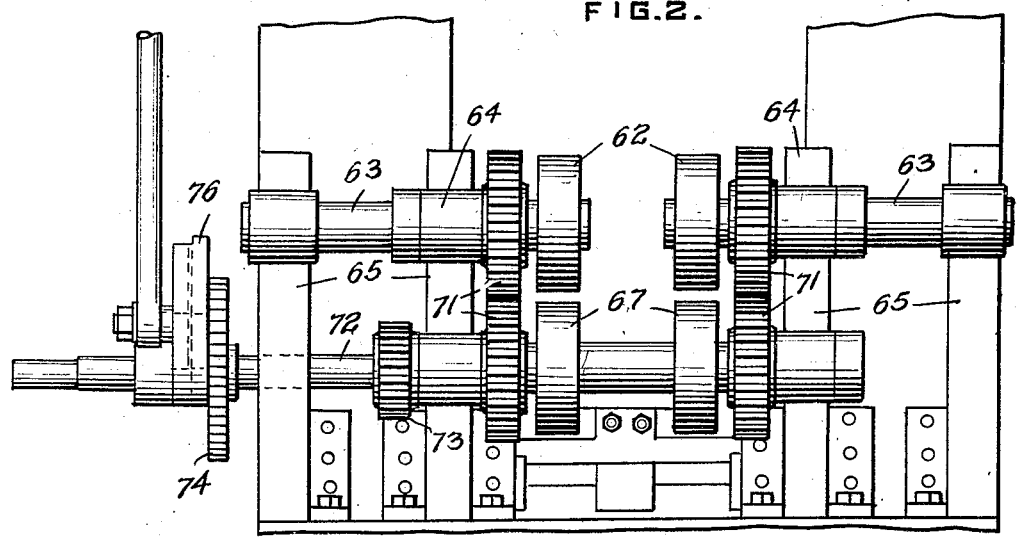
Figure 3:
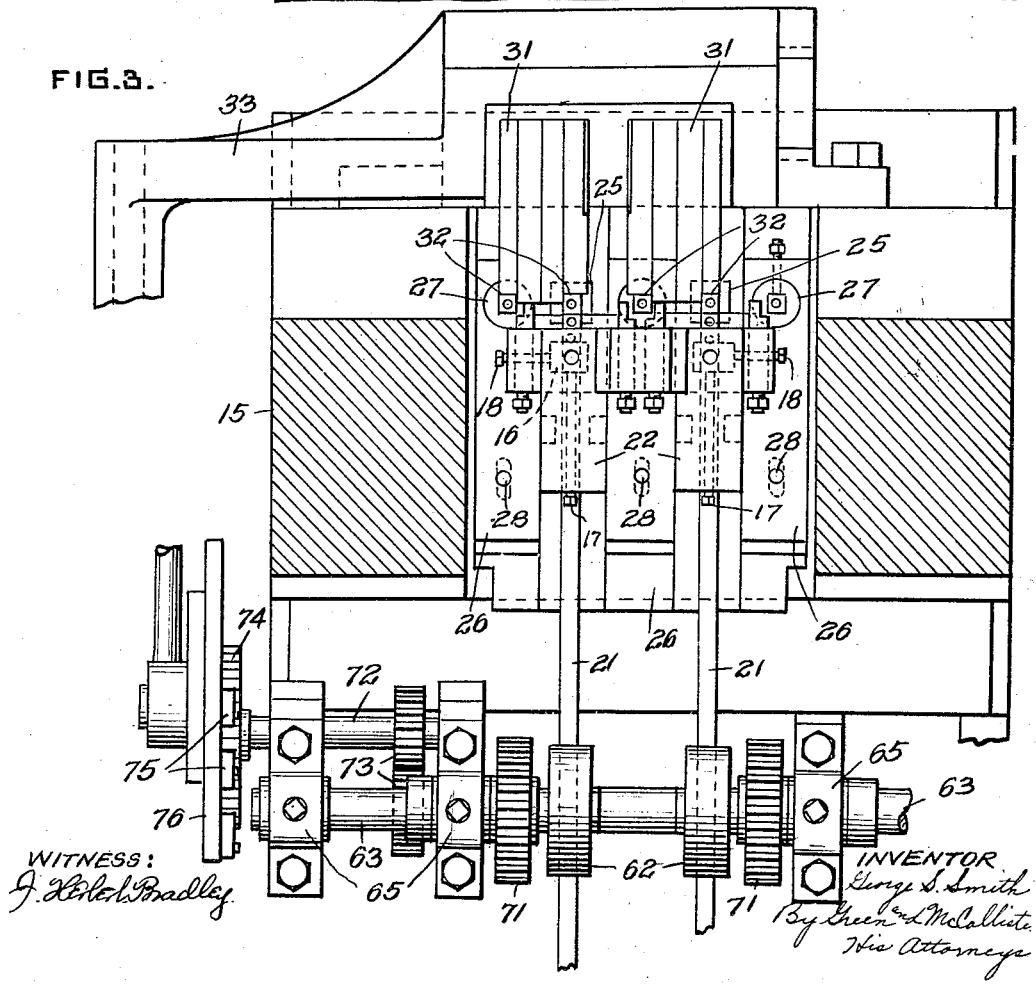
Figure 4:
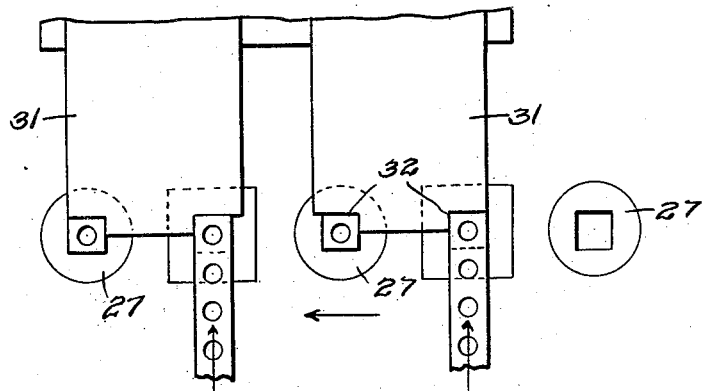
Figure 5:
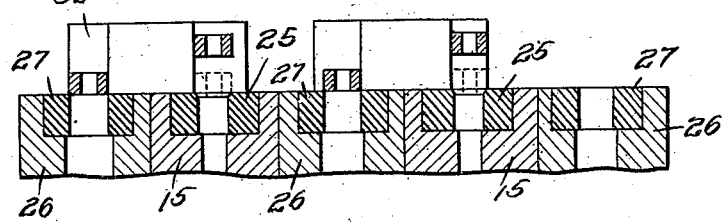
Figure 6:
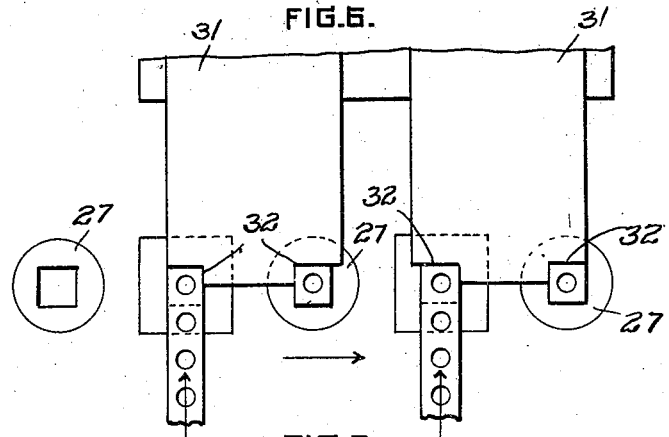
Figure 7:
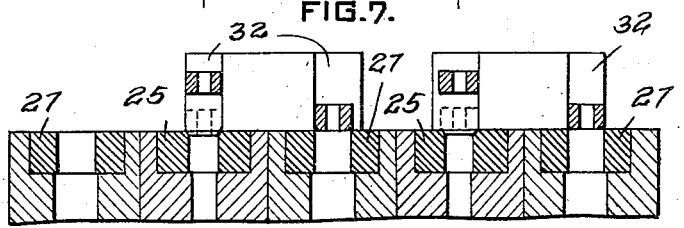
Figure 11:
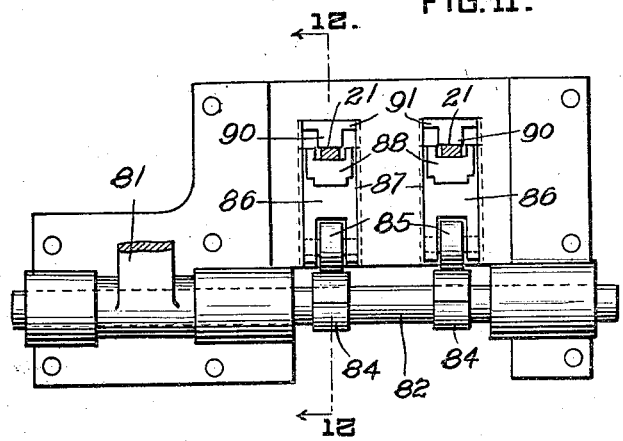
Figure 13:
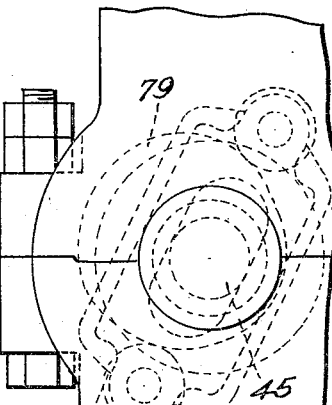
Figure 12:
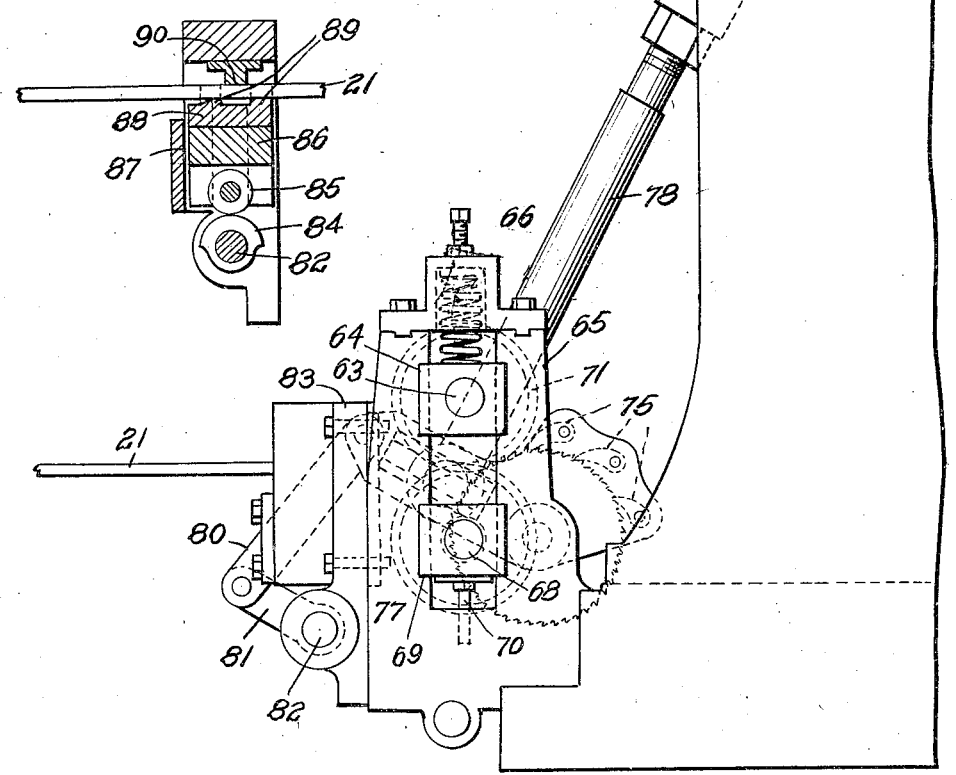

These and other objects which will be apparent to those skilled in this particular art are accomplished by means of this invention, one embodiment of which is illustrated in the accompanying drawings, in which Figure 1 is a view in side elevation of a machine constructed in accordance with one embodiment of this invention. Fig. 2 is a side elevation of a portion of the machine, showing the form of feed mechanism employed. Fig. 3 is a plan view of the machine bed illustrating the die blocks and associated details. Fig. 4 is a similar view illustrating the operation of the transfer mechanism. Fig. 5 is a sectional view through the die blocks. Fig. 6 is a view similar to Fig. 4 showing the transfer mechanism in a different position and Fig. 7 is a view similar to Fig. 5, showing the transfer mechanism in the position of Fig. 6. Fig. 8 is a vertical sectional view along the line 8—8 of Fig. 10. Fig. 9 is a similar view along the line 9—9 thereof. Fig. 10 is a transverse section on the line 10—10 of Fig. 8. Fig. 11 is an elevation showing certain details of the gripping mechanism. Fig. 12 is a sectional view on the line 12—12 of Fig. 11 and Fig. 13 is a view in side elevation showing the operating means for coordinating and synchronizing the feeding and gripping mechanisms.

In the particular embodiment of this invention which has been chosen for the purposes of illustration, two bars of stock are fed beneath a single reciprocating plunger head provided with punches and plungers for operating simultaneously upon each bar. A cutting or blanking die and cooperating plungers are associated with each bar for cutting off perforated blanks from the previously perforated ends of each bar. A finishing die is located within the die block on what may be termed the outside of each blanking die and a third finishing die is located between the two blanking dies. A transfer mechanism is reciprocated in such a manner that nut blanks are moved from the blanking dies to the finishing dies upon movement thereof in each direction, and, as a result, the finishing die which is located between the cutting dies receives a blank alternately from each cutting die so that it performs its function alternately upon blanks received from each of the cutting dies. The transfer mechanism has arms for handling the blanks from the different bars of stock and these arms are operated by a single operating mechanism, while an improved form of safety trip is employed for unclutching the power shaft of the machine from the driving pulley in case there is any jamming of the nut blanks in the transfer mechanism. A feeding device is employed for intermittently feeding each bar of stock into the machine and a clamping mechanism is associated with each feeding device for firmly clamping each bar against movement during operation of the plunger head. The feed devices are operated by a single driving mechanism which is also so connected with stock grippers as to synchronize the operation of the latter with relation to the feeding devices.

As illustrated, the machine is provided with a bed 15 having punching dies 16 suitably clamped therein by suitable clamping means such as screws or bolts 17 and 18 in position to cooperate with punches 19 secured to the plunger head 20. A bar of stock 21 is fed across each punching die under an associated stripper plate 22 and the usual channel 23 is provided in the bed through which the punched slugs drop out of the machine. A blanking or cutting die 24 is mounted in the bed beyond each punching die and a crowning die 25 is positioned under each blanking die. A die block 26 provided with a finishing die 27 is positioned in the bed between the adjacent stripper plates and similar die blocks and finishing dies are positioned on the outside of each of the stripper plates so that a single finishing die 27 is located midway between the two crowning dies 25 and a finishing die is also positioned on the outside of each crowning die. A pin and slot connection 28 between the machine bed and each finishing die block permits the finishing dies to be adjusted and clamped in the proper relation to the cutting dies by clamping bolts 29, Fig. 9, which are threaded into each block through openings 30 in the bed of sufficient size to permit the required adjustments.

A transfer mechanism is provided for moving the nut blanks from each crowning die to an associated finishing die and, as illustrated, this mechanism includes two transfer arms 31 having notches 32 in each corner thereof adjacent the dies and each arm is so proportioned that when one notch of one arm is in position to properly place a blank over one of the finishing dies the other notch of the arm is in position to engage a cut blank in the associated crowning die and vice versa, see Figs. 4 to 7. The transfer mechanism is operated so as to reciprocate the arms in such a manner as to transfer nut blanks from each cutting die to one of the associated finishing dies upon each reciprocation of the transfer mechanism. Each transfer arm is of such depth that the upper area of the notches 32 is on a level with the bars of stock being fed into the machine and consequently the transfer arms perform the additional functions of stock gauges for limiting the inward movement of the end of each bar of stock over the associated cutting die 24. The notches 32 of the transfer arm 31 while acting as limiting gages, also act or function as a frictional support for the free end of the nut blanks as they are sheared from the bars of stock. The friction takes place between the notches of the transfer arms and the free end of the nut blank at the place indicated at A in Fig. 8 of the drawings. By frictionally supporting the free end of the nut blank during the shearing operation of the punch member or cutting plunger 33 the faces of the nut blank are straight and regular after the punching operation is completed.

When one of the cutting plungers 33 cuts off a nut blank and moves it into the crowning die the faces of the notches 32 steady the blank being cut and aid in properly positioning it in the crowning die into which it descends under the impulse of the plunger, as shown in dotted lines in Fig. 7. Obviously, movement of the transfer arms 31 then moves the crowned nut blank into one or the other of the associated finishing dies 27.

The transfer arms are suitably mounted upon a reciprocable slide 34 provided with a roller 35 mounted in the projecting end of the slide which extends outwardly beyond one side of the machine frame. The oppositely beveled faces 36 and 37 of two sliding members 38 and 39 slidably mounted side by side in brackets 40, see Fig. 1, will obviously reciprocate the transfer slide 34 and the sliding members 38 and 39 are alternately reciprocated in opposite directions by suitably formed cams 41 mounted on a shaft 42 driven by a gear 43 meshing with a gear 44 which is loosely mounted upon the power shaft 45 of the machine and to which it is clutched by a collar 46 splined on the shaft.

The collar 46 is provided with one or more teeth 47 having an angular face 48 engaging a similar formed notch or notches 49 in the hub of the gear 44. The collar is normally pressed by a coil spring 50 to cause engagement of the teeth and notches so as to make a driving connection for operating the transfer mechanism. If there is more than one tooth and notch they are so positioned that the teeth of the collar will engage in the notches of the gear hub only when the power shaft 45 and the plunger head 20 are in proper position with relation to the transfer mechanism to properly synchronize the operations of the various mechanisms driven by the power shaft.

The power shaft 45 is operated by a pulley 58 which is adapted to be connected to or disconnected from the shaft by a suitable clutch 51 which may be of any desired construction. A clutch operating lever 52 is so connected with the clutch that it will release the clutch upon upward movement of the lever and cause the clutch to engage upon downward movement thereof. A spring 53 normally tends to hold the lever 52 in its uppermost position so as to release the clutch. The lever 52 is extended downwardly and connected by a link 53 to one end of a horizontal lever 54 pivoted to and extending across the end of the machine and having at its other end a latch 55 which is adapted to engage a catch 56 formed by the bent horizontal end of a bar 57 extending downwardly from the brackets 40. The latch 55 is loosely pivoted to the associated end of the horizontal lever 54 so that by pushing the latch off the catch 56 the lever 54 will be released therefrom and the spring 53 can retract the clutch lever 52 and release the clutch. This operation is automatically performed as a result of jamming of the nuts in the transfer mechanism or from any other cause which would hinder the movement thereof. If, from any cause, movement of the transfer mechanism is resisted the inclined faces 48 between the teeth 47 of the collar and the notches 49 of the gear hub will cause the collar 46 to be moved along the shaft out of engagement with the gear hub against the pressure of the spring 50. A vertically extending lever 59 is pivoted in a bracket 60 so that its upper end will be moved by movement of the collar and its lower bent end 61, upon such movement, will engage the latch 55 and knock it off the catch 56, thus providing an automatic device for stopping the operation of the transfer mechanism when necessary.

Suitable mechanism is provided for individually feeding the stock bars 21 to the operating mechanism and the individual feeds are preferably driven by a single operating means. As illustrated, upper feed rolls 62 are mounted on the adjacent ends of separate aligned shafts 63 suitably supported in bearing blocks 64 slidably mounted in a bearing block housing 65, see Fig. 13. Springs 66 are associated with each bearing block for yieldingly pressing the upper rolls 62 downwardly against the stock bar and into contact with lower feed rolls 67 on a feed shaft 68 mounted in bearing blocks 69 in the housing in which they are adjustably supported by threaded block supporting members 70. The upper feed roll supporting shafts 63 are geared to the lower feed roll supporting shaft 68 by intermeshing gears 71. A drive shaft 72 mounted in the housing 65 is geared to the lower feed shaft 68 through gears 73 and projects outwardly at one side of the machine frame. A ratchet 74 is secured to the projecting end of the shaft 72 and is intermittently rotated by pawls 75 mounted on a pawl supporting segmental arm 76 loosely supported upon the feed mechanism operating shaft adjacent the ratchet. The pawl supporting segment 76 is provided with an outwardly extending slotted arm 77 and the lower end of an operating bar 78 is adjustably secured in the slot of the ratchet operating arm 77. The upper end of the operating rod 78 is associated with a cam 79 on the power shaft 45 of the machine for oscillating the pawls 75 to intermittently rotate the ratchet wheel 74 as is well known in the art.

The outer end of the arm 77 is connected by a link 80 to a crank arm 81 secured to a shaft 82 supported in bearings formed in a plate 83 bolted to the feed shaft housing 65 which also supports the gripper mechanism for gripping and straightening the stock between feeding movements. A separate gripper is provided for each stock bar and each mechanism is operated by a separate cam 84 on the shaft 82. Each cam engages a cam roller 85 mounted in the lower end of a gripper slide 86 reciprocably mounted in recesses 87 in the gripper housing below each stock bar. Removable wear members 88 are secured in the top of each gripper slide and are provided with spaced stock bar engaging portions 89 for engaging the lower face of the stock bar upon upward movement of the slide so as to clamp the bar against a projection 90 formed in a removable wear member 91 mounted in the upper end of the gripper slide recess above the stock bar and positioned so as to engage the upper face of the bar between the points of engagement of the lower gripper member on the lower face, see Fig. 12. As a result of this form of gripper mechanism each stock bar is simultaneously gripped and straightened in case of any irregularities in the contour of the bar. The amount of feed given the bars is adjusted by varying the position of the lower end of the operating rod 78 in the slotted arm 77, but it will be apparent that such adjustment can have no effect upon the operation of the gripper slide so that although the same mechanism operates both devices the one can be adjusted without affecting the other.

In operation, the bars of stock are simultaneously and intermittently fed into the machine through the intermittent rotation of the single driving ratchet 74 which operates the separate feed rollers for each bar. The upper feed rollers 62 being separately spring pressed by the spring 66 against the associated bar of stock, each roller can yield independently of the other roller to accommodate slight irregularities which may be present in the formation of each bar of stock. After the bars have been fed the predetermined distance, and while the feed rollers are stationary the operating rod 78 which has caused the feeding movement then rotates the gripper operating cams 84, through the connections above described, so as to cause the gripper slides 86 to move upwardly into gripping relation with the separate bars of stock. As above noted, this mechanism not only performs the functions of grippers but, due to its formation also operates as a straightening mechanism. While the bars are so held the plunger head 20 descends in the usual manner and the punch 19 punches out a slug to form the bore of the nut blank. As the perforated end of the rod is fed into position over the cutting die it is accurately located in such position by its abutting relation with the upper area of the notches 32 formed in the transfer arms 31. The perforated end of each bar is cut off by the descent of the cutting plunger 33 and the cut end is forced into the subjacent crowning die 25 to form a rough blank. Immediately thereafter the transfer slide is moved through the operating mechanism hereinbefore described so as to shift the rough, crowned blanks to an adjacent finishing die. Such movement of the fingers 31 brings the other notches 32 opposite the cutting dies to gauge the next feed of the stock and the next descent of the plunger head forms two more rough blanks and at the same time the finishing plungers 95 force the previously finished blanks through the finishing dies 27 into which they were moved by the transfer mechanism. The transfer arms are then moved in the opposite direction so that the rough blanks just formed are shifted to the finishing dies on the opposite side of the respective blanking dies and the other notches 32 of each finger are moved back to cooperating position with the cutting dies.

It will be apparent that the single finishing die 27 between the cutting dies 24 constitutes a finishing die for finishing rough blanks which are moved into position therein alternately from the two cutting dies while the finishing dies on the outsides of the two cutting dies finish blanks which are formed only in the adjacent cutting dies. In other words, the center finishing die has a nut forced through it upon each descent of the plunger head while the outer finishing dies operate upon a nut upon every other descent of the plunger head.

Although I have described what I now consider to be the preferred embodiment of this invention, it will be obvious that various changes, additions, substitutions and omissions can be made therein without departing from the spirit of this invention or the scope of the appended claims.

What I claim as new and desire to secure by Letters Patent is:

1. The combination in a nut making machine of means for feeding separate bars of stock thereto, a blanking die for each bar and a finishing die for trimming blanks received from each of said blanking dies.

2. The combination in a nut making machine of means for feeding separate bars of stock thereto, a blanking die for each bar of stock, a finishing die between said blanking dies, a finishing die on the opposite sides of each of said blanking dies from said first finishing die and means for transferring blanks from said blanking dies to said finishing dies.

3. The combination in a nut making machine of means for feeding separate bars of stock thereto, a blanking die for each bar of stock, a finishing die between said blanking dies and means for transferring nut blanks to said finishing die alternately from each of said blanking dies.

4. The combination in a nut making machine of means for feeding separate bars of stock thereto, a blanking die for each bar of stock, a finishing die between said blanking dies, a finishing die on the opposite sides of each of said blanking dies from said first finishing die, a transfer arm associated with each of said blanking dies and means for moving said arms so as to transfer blanks from said blanking dies to said finishing dies upon movement of said arms in each direction.

5. The combination in a nut making machine of means for feeding separate bars of stock thereto, a blanking die for each bar of stock, a finishing die between said blanking dies, a finishing die on the opposite sides of each of said blanking dies from said first finishing die, a transfer arm associated with each of said blanking dies, a reciprocating slide for supporting said transfer arms and means for operating said slide so as to transfer blanks from said blanking dies to said finishing dies upon movement of said arms in each direction.

6. The combination in a nut making machine of a blanking die, means for feeding stock to said die, a gauge for positioning stock over said die, a finishing die and means for operating said gauge so as to transfer a nut blank formed in said blanking die to said finishing die.

7. The combination in a nut making machine of a blanking die, means for feeding stock to said die, a transfer arm associated with said blanking die and provided with spaced notches adapted to be positioned adjacent said die so as to form a gauge for positioning the end of said stock over said die, and means for shifting said arm so as to move a nut blank in one notch from the blanking die and to position the other notch in cooperative relation with said blanking die.

8. The combination in a nut making machine of a blanking die, means for feeding stock to said die, a finishing die, a gauge for positioning stock over said blanking die and means for moving said gauge so as to transfer a blank from said blanking die to said finishing die.

9. The combination in a nut making machine of a blanking die, means for feeding stock to said die, a finishing die, a gauge provided with a notch for receiving the end of said stock so as to position said stock over said blanking die and means for moving said gauge so as to transfer a blank to said finishing die.

10. In a punch press, in combination, a cutting die, a friction support and limiting gage spaced from the cutting die, and a punch disposed to sever material placed over the cutting die, the friction support and limiting gage operating to support the free end of the material to be severed by the punch and cutting die.

In testimony whereof, I have hereunto subscribed my name this 9th day of March, 1926.

GEORGE S. SMITH.